(12) United States Patent
Miller et al.

(10) Patent No.: US 9,007,642 B2
(45) Date of Patent: *Apr. 14, 2015

(54) AUTHENTICATING PRINTERS PRIOR TO PAIRING WITH PORTABLE ELECTRONIC DEVICES

(71) Applicant: Apple Inc., Cupertino, CA (US)

(72) Inventors: Howard A. Miller, Saratoga, CA (US);
Michael R. Sweet, Blezard Valley (CA);
Tito Thomas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,860

(22) Filed: Feb. 10, 2014

(65) Prior Publication Data

US 2014/0153049 A1 Jun. 5, 2014

Related U.S. Application Data

(63) Continuation of application No. 13/310,266, filed on Dec. 2, 2011, now Pat. No. 8,681,361.

(51) Int. Cl.
*G06F 3/12* (2006.01)
*G06K 15/00* (2006.01)
*H04N 1/60* (2006.01)

(52) U.S. Cl.
CPC ............ *G06F 3/1296* (2013.01); *G06F 3/1204* (2013.01); *G06F 3/1225* (2013.01); *G06F 3/1232* (2013.01); *G06F 3/1236* (2013.01); *G06F 3/1285* (2013.01); *G06F 3/1292* (2013.01); *H04N 2201/006* (2013.01); *H04N 2201/0036* (2013.01); *H04N 2201/0039* (2013.01); *H04N 2201/0041* (2013.01); *H04N 2201/0044* (2013.01); *H04N 2201/0055* (2013.01); *H04N 2201/0072* (2013.01); *H04N 2201/0096* (2013.01)

(58) Field of Classification Search
USPC ........ 315/1.15, 1.14, 1.1, 3.24, 1.9, 508, 403, 315/476, 296, 426.02; 358/1.15, 1.14, 1.1, 358/3.24, 1.9, 508, 403, 476, 296, 426.02; 455/517, 456.1, 3.01, 3.05, 414.1, 455/414.2, 420, 426.1, 432.3, 453.1, 437, 455/39, 41.3, 73, 556.2, 91, 95, 156.1; 707/21, 627, 634, 818; 713/1, 100, 182
See application file for complete search history.

(56) References Cited

U.S. PATENT DOCUMENTS

2003/0037033 A1* 2/2003 Nyman et al. ..................... 707/1
2008/0261640 A1* 10/2008 Yoshida ......................... 455/517

* cited by examiner

*Primary Examiner* — Ngon Nguyen
(74) *Attorney, Agent, or Firm* — Park, Vaughan, Fleming & Dowler LLP; Anthony P. Jones

(57) ABSTRACT

The disclosed embodiments provide a system that facilitates the execution of a print job. During operation, the system receives, at a printer, a signal from a portable electronic device indicating the printer has been selected for the print job. Next, in response to the selection, the system generates an output that facilitates identification of the printer by a user of the portable electronic device. The system also provides a mechanism for confirming physical access to the printer by the user. Upon confirming the physical access to the printer by the user, the system establishes a connection between the portable electronic device and the printer, wherein the connection is subsequently used by the portable electronic device and the printer to perform the print job.

20 Claims, 7 Drawing Sheets

AUTHENTICATING PRINTERS PRIOR TO PAIRING WITH PORTABLE ELECTRONIC DEVICES

RELATED APPLICATION

The instant application is a continuation of, and hereby claims priority under 35 U.S.C. §120 to, pending U.S. patent application Ser. No. 13/310,266 by the same inventors, which is entitled "Authenticating Printers Prior to Pairing with Portable Electronic Devices," which was filed on 2 Dec. 2011 and which is incorporated by reference.

The subject matter of this application is related to the subject matter in co-pending non-provisional application Ser. No. 13/310,239, by inventors Howard A. Miller and Michael R. Sweet, entitled "Ad-Hoc Discovery and Selection of Printers for Print Jobs," which was filed on 2 Dec. 2011. The subject matter of this application is also related to the subject matter in co-pending non-provisional application Ser. No. 13/310,254, by inventors Howard A. Miller and Michael R. Sweet, entitled "Facilitating Communication between Portable Electronic Devices and Printers," which was filed on 2 Dec. 2011.

BACKGROUND

1. Field

The present embodiments relate to printers for computer systems. More specifically, the present embodiments relate to techniques for authenticating a printer prior to pairing the printer with a portable electronic device and using the printer to perform a print job for the portable electronic devices.

2. Related Art

Printers are often a problem for computer users. When a computer user initially installs a printer, the cabling and power cords are typically relatively straightforward to hook up. However, the user also has to install a printer-specific driver, which involves loading the driver from a disk and/or navigating to a website and downloading the driver. Even if the printer driver is already loaded into the computer system, the user may have to load and install an update for the driver from the printer manufacturer's website. Such installation operations are time-consuming and commonly require the user to find and enter a long software-license key.

Printers pose an even bigger problem for users of portable electronic devices, such as laptop computers, tablet computers, portable media players, or smartphones. Such portable electronic devices are seldom configured with the requisite printer driver software. In addition, installing the appropriate printer driver can be bothersome, especially if the user of the portable electronic device only intends to use the nearby printer once or twice. Portable electronic devices may also have limited storage space, which makes it impractical for them to store a large number of printer drivers.

Hence, what is needed is a system that facilitates printing from a portable electronic device to a nearby printer without the above-described problems.

SUMMARY

The disclosed embodiments provide a system that facilitates the execution of a print job. During operation, the system receives, at a printer, a signal from a portable electronic device indicating the printer has been selected for the print job. Next, in response to the selection, the system generates an output that facilitates identification of the printer by a user of the portable electronic device. The system also provides a mechanism for confirming physical access to the printer by the user. Upon confirming the physical access to the printer by the user, the system establishes a direct connection between the portable electronic device and the printer, wherein the direct connection is subsequently used by the portable electronic device and the printer to perform the print job.

In some embodiments, the output is at least one of a beep, a custom sound, a flash, and a message.

In some embodiments, the mechanism for confirming physical access to the printer by the user is at least one of user input on the printer or the portable electronic device, and detection of proximity between the portable electronic device and the printer.

In some embodiments, the user input on the printer or the portable electronic device is at least one of a button push and a personal identifier.

In some embodiments, detection of proximity between the portable electronic device and the printer involves at least one of:
(i) detection of audible output from the printer on the portable electronic device;
(ii) a radio-frequency identification (RFID) technique;
(iii) an infrared-location technique;
(iv) a geolocation technique; and
(v) a Wi-Fi network.

In some embodiments, the direct connection corresponds to a Wi-Fi connection.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
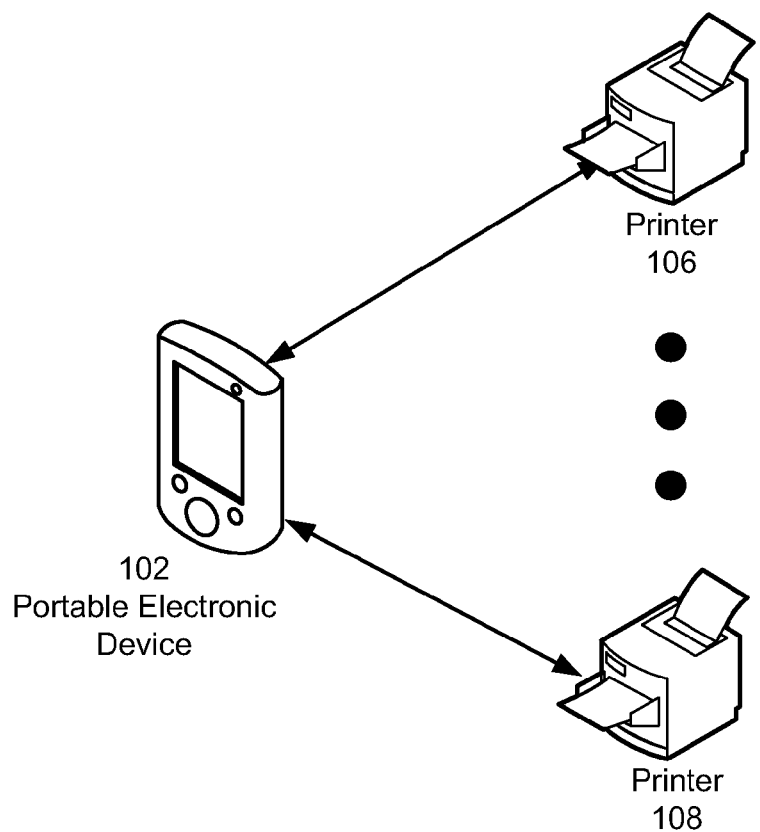
FIG. 1 shows a printing system in accordance with the disclosed embodiments.

The disclosed embodiments facilitate the performing of print jobs from portable electronic devices. As shown in FIG. 1, a portable electronic device 102 includes functionality to communicate with a set of printers 106-108. Portable electronic device 102 may correspond to a mobile phone, laptop computer, tablet computer, personal digital assistant (PDA), portable media player, and/or other type of battery-powered electronic device. Printers 106-108 may correspond to network printers that are capable of wired and/or wireless communications. Alternatively, one or more printers may connect to a print server as local peripherals using one or more printer cables and/or one or more ports (e.g., parallel ports, serial ports, Universal Serial Bus (USB) ports).

Portable electronic device 102 may interact with printers 106-108 through one or more networks. Such networks may include any type of communication channel capable of coupling together network nodes. For example, the network(s) may include a wireless network connection, such as a Bluetooth (Bluetooth™ is a registered trademark of Bluetooth SIG, Inc.) network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology.

Figure 2:
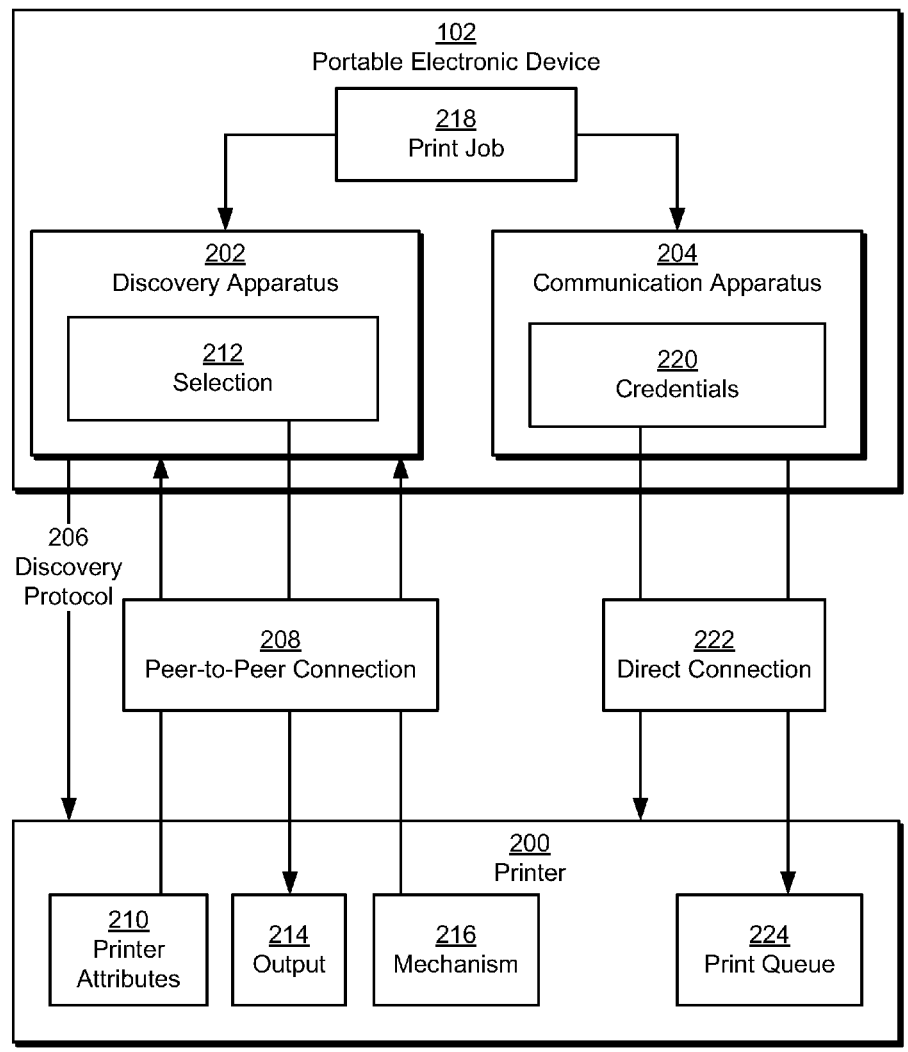
FIG. 2 shows a system for performing a print job in accordance with the disclosed embodiments.

More specifically, portable electronic device 102 may include functionality to communicate with printers 106-108 using both peer-to-peer connections and direct (e.g., structured network) connections. As shown in FIG. 2, a discovery apparatus 202 in portable electronic device 102 may discover (e.g., detect) a nearby printer 200 using a discovery protocol 206 such as Bonjour (Bonjour™ is a registered trademark of Apple Inc.). Next, portable electronic device 102 may establish a peer-to-peer connection 208 with printer 200 and use peer-to-peer connection 208 to obtain a set of printer attributes 210 from printer 200. For example, portable electronic device 102 may use peer-to-peer connection 208 to query printer 200 for printer attributes 210. In response to the query, printer 200 may send printer attributes 210 over peer-to-peer connection 208 to portable electronic device 102.

In one or more embodiments, printer attributes 210 include one or more printer capabilities. Such printer capabilities may include available and/or supported media sizes, border sizes, media types (e.g., paper or photo media), and/or print qualities; finishing attributes such as stapling, hole punching and booklets; and information related to printer features, such as double-sided printing, output bits, and media sources. The printer capabilities may also include file-related attributes, such as supported file sizes, file-format versions, and/or file-format extensions. Finally, the printer capabilities may specify supported color spaces, bit depths, and/or resolutions.

Printer attributes 210 may also include a printer status for printer 200. The printer status may specify whether the printer is off-line, whether the printer is busy, and/or whether an error condition exists in the printer. The printer capabilities and/or status may be stored using TXT records, Internet Printing Protocol (IPP) attributes, and/or other types of data available on printer 200.

If printer attributes 210 match a print job 218 on portable electronic device 102, portable electronic device 102 may establish a direct connection 222 with printer 200 and send print job 218 over direct connection 222 to the printer. For example, portable electronic device 102 may use a Wi-Fi network and IPP to connect directly with printer 200 and transmit print job 218 as a Portable Document Format (PDF) document and/or image and a set of print settings to printer 200. Printer 200 may then place print job 218 into a print queue 224 and execute print job 218 after print jobs preceding print job 218 in print queue 224 have completed and/or cancelled. While print job 218 is executing, portable electronic device 102 may monitor print job 218 over direct connection 222. Portable electronic device 102 may then remove direct connection 222 after printer 200 has completed print job 218.

In other words, portable electronic device 102 may use temporary peer-to-peer connections with a set of nearby printers to detect, interact with, and obtain printer attributes (e.g., printer attributes 210) from the printers (e.g., printer 200) without requiring the printers to join a structured (e.g., Wi-Fi) network, such as the structured network to which portable electronic device 102 is connected. Once a printer (e.g., printer 200) is selected for use in executing print job 218, portable electronic device 102 may establish a direct connection (e.g., direct connection 222) with the printer over a structured network to facilitate the completion of the print job by the printer.

The system of FIG. 2 may also include functionality to authenticate use of printer 200 by a user of portable electronic device 102 prior to the establishment of direct connection 222. First, portable electronic device 102 may obtain a selection 212 of printer 200 for print job 218. For example, selection 212 may be made by a user of portable electronic device 102 through a graphical user interface (GUI) provided by portable electronic device 102. Next, discovery apparatus 202 may transmit selection 212 to printer 200 over peer-to-peer connection 208.

In response to selection 212, printer 200 may generate output 214 that facilitates identification of printer 200 by the user. For example, printer 200 may generate a beep, a custom sound (e.g., ringtone), a flash, and/or a message to allow the user to identify and/or locate printer 200 in the vicinity of portable electronic device 102.

Printer 200 may also provide a mechanism 216 for confirming physical access to printer 200 by the user. Mechanism 216 may detect physical access to printer 200 through user input on printer 200 and/or portable electronic device 102.

For example, mechanism 216 may allow the user to confirm physical access to printer 200 by pushing a button on printer 200, entering a personal identifier associated with printer 200 on portable electronic device 102, and/or entering a personal identifier associated with the user and/or portable electronic device 102 on printer 200. Mechanism 216 may also confirm physical access to printer 200 through the detection of proximity between portable electronic device 102 and printer 200. For example, mechanism 216 may confirm physical proximity between portable electronic device 102 and printer 200 by generating audible output on printer 200 that a nearby portable electronic device 102 is capable of detecting. Alternatively, mechanism 216 may use a radio-frequency identification (RFID) technique, an infrared-location technique, a geolocation technique, and/or a Wi-Fi network near both portable electronic device 102 and printer 200 to detect proximity of portable electronic device 102 to printer 200.

After use of printer 200 by the user of portable electronic device 102 is authenticated, direct connection 222 may be established by printer 200 and/or portable electronic device 102, thus pairing printer 200 and portable electronic device 102. Such authentication may prevent unauthorized use of printer 200 and/or the transmission of print jobs (e.g., print job 218) to printer 200 if the user is unable to physically access printer 200.

As mentioned above, direct connection 222 may correspond to a Wi-Fi connection, in which portable electronic device 102 and printer 200 are connected to one another through a structured (e.g., Wi-Fi) network. To facilitate the creation of direct connection 222, portable electronic device 102 and/or printer 200 may use peer-to-peer connection 208 to confirm use of the structured network for subsequent communication between portable electronic device 102 and printer 200. For example, printer 200 may request permission to join the Wi-Fi network to which portable electronic device 102 is connected upon confirming physical access to printer 200 by the user of portable electronic device 102. The request may then be forwarded by discovery apparatus 202 to the user through the GUI of portable electronic device 102 for approval or denial by the user. Conversely, discovery apparatus 202 may automatically trigger use of the structured network for the communication after use of printer 200 by the user is authenticated and/or if the distance between portable electronic device 102 and printer 200 exceeds the range of peer-to-peer connection 208.

Next, communication apparatus 204 may enable use of the structured network for the communication (e.g., over direct connection 222) by transmitting credentials 220 for the structured network to printer 200. For example, portable electronic device 102 may use peer-to-peer connection 208 to send credentials 220 as a network name and a password for a Wi-Fi network to which portable electronic device 102. Printer 200 may then use credentials 220 to connect to the structured network, and the communication may be transferred from peer-to-peer connection 208 to direct connection 222. On the other hand, if the structured network is congested, the communication may be transferred from direct connection 222 back to peer-to-peer connection 208.

Consequently, the system of FIG. 2 may streamline printing on portable electronic device 102 by facilitating the detection, identification, authentication, and/or use of printer 200 by portable electronic device 102. More specifically, discovery apparatus 202 may enable the use of ad-hoc peer-to-peer connections (e.g., peer-to-peer connection 208) in detecting and matching nearby printers to print jobs on portable electronic device 102, as well as the authentication of such printers for use by the user of portable electronic device 102. In addition, communication apparatus 204 may minimize the amount of user input required to establish a direct connection (e.g., direct connection 222) with the printer (e.g., printer 200) selected for a print job (e.g., print job 218).

Those skilled in the art will appreciate that the system of FIG. 2 may be implemented in a variety of ways. For example, discovery apparatus 202 and communication apparatus 204 may be provided by the same software and/or hardware component, or discovery apparatus 202 and communication apparatus 204 may execute independently from one another. Similarly, discovery apparatus 202 and/or communication apparatus 204 may be implemented by printer 200, in addition to or in lieu of corresponding components on portable electronic device 102.

Figure 3:
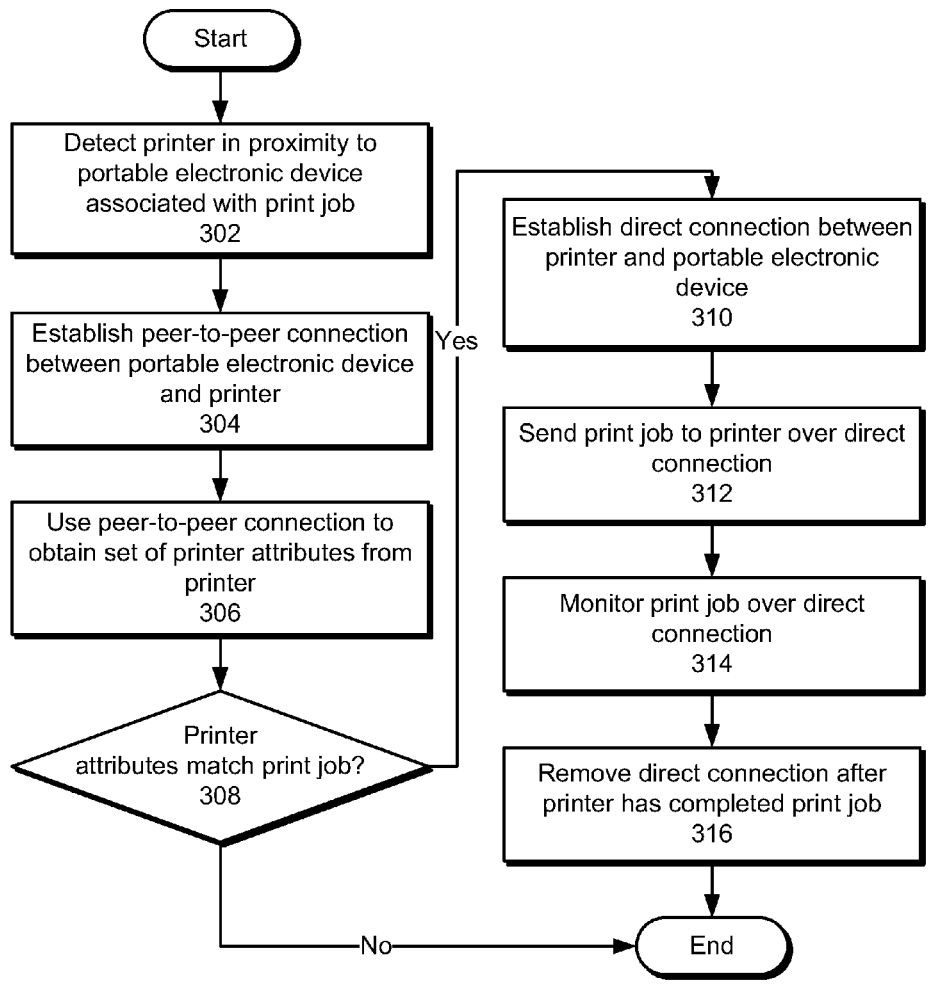
FIG. 3 shows a flowchart illustrating the process of performing a print job in accordance with the disclosed embodiments.

FIG. 3 shows a flowchart illustrating the process of performing a print job in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a printer is detected in proximity to a portable electronic device associated with the print job (operation 302). The printer may be detected using a discovery protocol such as Bonjour. Next, a peer-to-peer connection is established between the portable electronic device and the printer (operation 304). While the peer-to-peer connection is established, the portable electronic device and printer may be paired, and/or use of the printer by the portable electronic device may be authenticated, as discussed in further detail below with respect to FIGS. 4-5.

The peer-to-peer connection is also used to obtain a set of printer attributes from the printer (operation 306). The printer attributes may include a printer capability such as a supported and/or available media size, media type, border size, resolution, print quality, file format, and/or other capability of the printer. The printer attributes may also include a printer status that specifies whether the printer is off-line, whether the printer is busy, and/or whether an error condition exists in the printer.

The printer attributes may be compared with the print job to determine if the printer attributes match the print job (operation 308). For example, the printer attributes may match the print job if the printer supports and/or includes media sizes, media types, ink, and/or other print settings that are suitable for execution of the print job. If the printer attributes do not match the print job, the printer may not be used to perform the print job.

If the printer attributes match the print job, the printer may be used to execute the print job. First, a direct connection between the printer and the portable electronic device is established (operation 310). The direct connection may correspond to a Wi-Fi connection, in which the printer and portable electronic device communicate with one another over the same Wi-Fi network. Next, the print job is sent to the printer over the direct connection (operation 312) so that the printer may execute the print job. For example, the print job may be transmitted from the portable electronic device to the printer using IPP and placed in a print queue by the printer. The print job may then be performed by the printer after other print jobs preceding the print job in the print queue have been completed and/or cancelled.

The print job may also be monitored over the direct connection (operation 314) while the print job is pending. During the monitoring, events related to the print job (e.g., delays, cancellations, paper jams, etc.) may be obtained from the printer by the portable electronic device, managed by the portable electronic device, and/or communicated to a user of the portable electronic device. Finally, the direct connection may be removed after the printer has completed the print job (operation 316).

Figure 4:
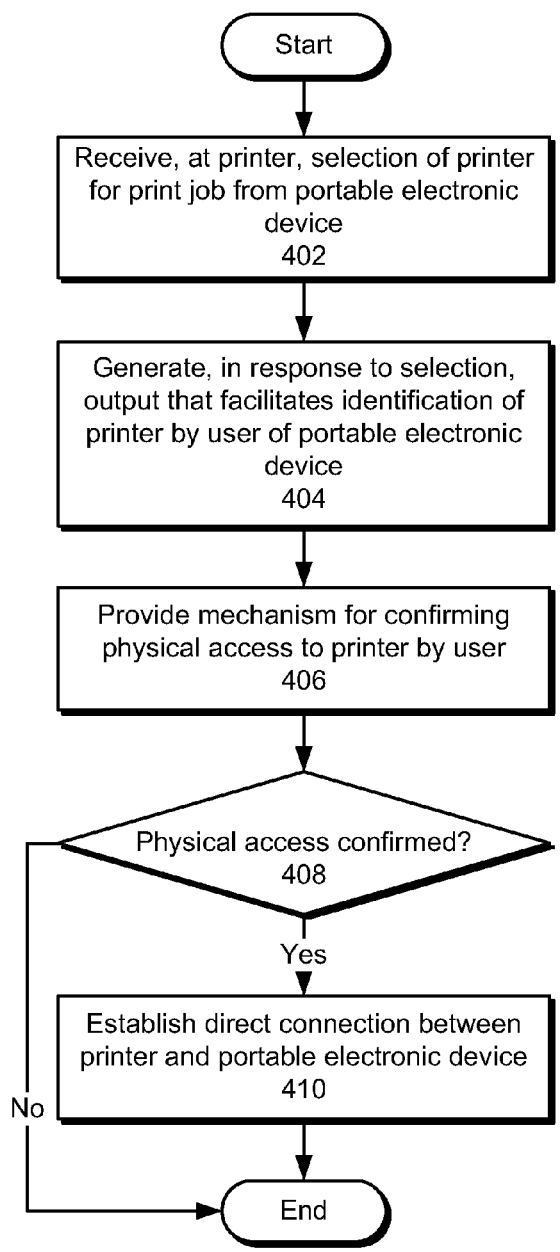
FIG. 4 shows a flowchart illustrating the process of facilitating the execution of a print job in accordance with the disclosed embodiments.

FIG. 4 shows a flowchart illustrating the process of facilitating the execution of a print job in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a selection of a printer for a print job from a portable electronic device is received at the printer (operation 402). The selection may be transmitted from the portable electronic device to the printer over a peer-to-peer connection. In response to the selection, output that facilitates identification of the printer by a user of the portable electronic device is generated (operation 404). The output may correspond to a beep, a custom sound (e.g., ringtone), a flash, and/or a message on the printer.

In addition, a mechanism for confirming physical access to the printer by the user is provided (operation 406). The mechanism may correspond to user input on the printer and/or the portable electronic device, such as a button push and/or a personal identifier. Alternatively, the mechanism may involve the detection of proximity between the portable electronic device and the printer through the sensing of audible output from the printer on the portable electronic device, an RFID technique, an infrared-location technique, a geolocation technique, and/or a Wi-Fi network.

Physical access to the printer by the user may be confirmed (operation 408) by the mechanism. If physical access to the printer by the user is not confirmed by the mechanism, use of the printer by the user is not authenticated, and the printer and portable electronic device are not paired. If physical access to the printer by the user is confirmed by the mechanism, use of the printer by the user is authenticated, and a direct connection is established between the printer and the portable electronic device (operation 410), thus pairing the printer and the portable electronic device. The direct connection may subsequently be used by the portable electronic device and the printer to perform the print job, as described above. Establishment of direct connections between printers and portable electronic devices is discussed in further detail below with respect to FIG. 6.

Figure 5:
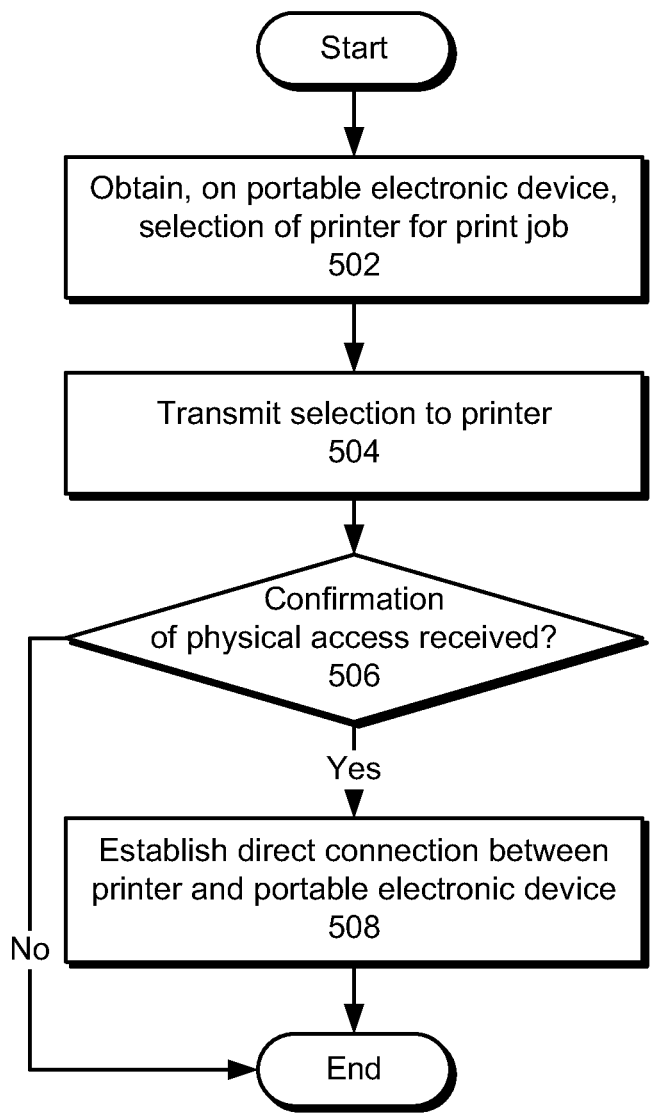
FIG. 5 shows a flowchart illustrating the process of facilitating communication between a portable electronic device and a printer in accordance with the disclosed embodiments.

FIG. 5 shows a flowchart illustrating the process of facilitating communication between a portable electronic device and a printer in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, a selection of the printer for the print job is obtained on the portable electronic device (operation 502). The selection may be made by the portable electronic device and/or a user of the portable electronic device. For example, the portable electronic device may select the printer as the closest printer with printer attributes that match the print job and to which the user has access rights. On the other hand, the user may select the printer from a list of nearby printers detected using a discovery protocol and displayed within a GUI on the portable electronic device. Once the selection is made, the selection is transmitted to the printer (operation 504), where the selection is used by the printer to generate output that facilitates identification of the printer by the user.

Confirmation of physical access to the printer by the user may be received (operation 506) after the output is generated. If the confirmation is not received, use of the printer by the user is not authenticated, and the printer and portable electronic device are not paired. If the confirmation is received, use of the printer by the user is authenticated, and a direct connection is established between the printer and the portable electronic device (operation 508), thus pairing the printer and the portable electronic device. The direct connection may then be used by the portable electronic device and the printer to perform the print job.

Figure 6:
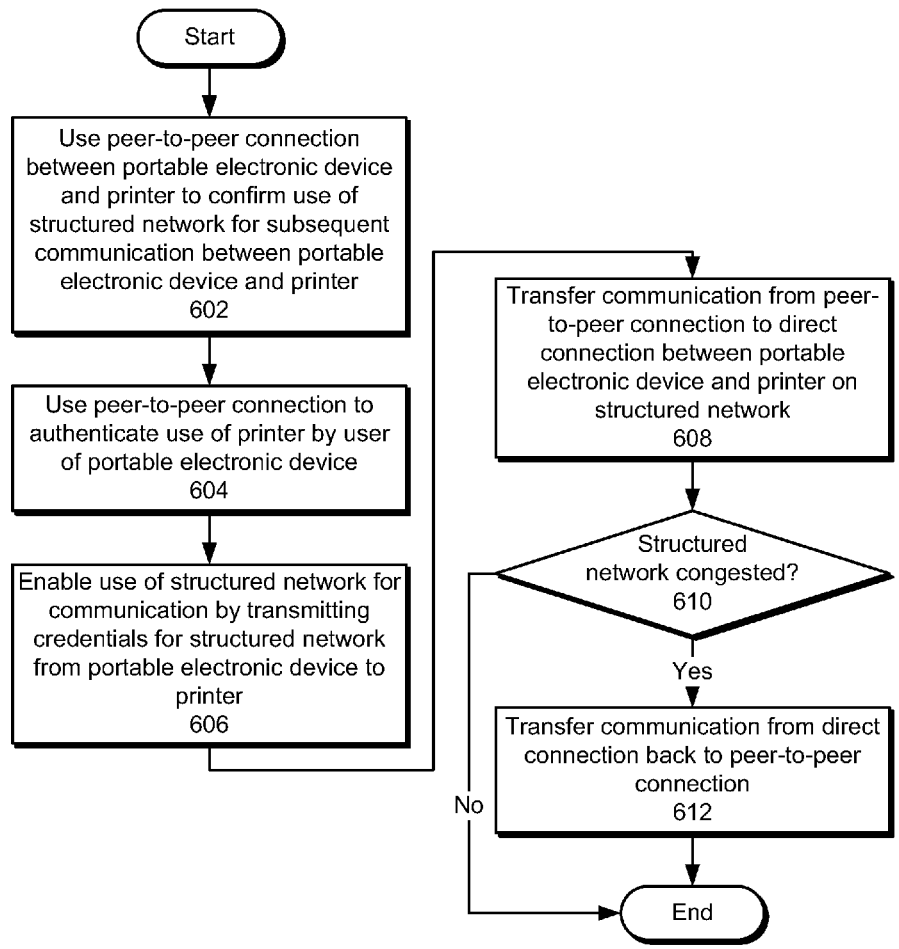
FIG. 6 shows a flowchart illustrating the process of facilitating communication between a portable electronic device connected to a structured network and a printer in accordance with the disclosed embodiments.

FIG. 6 shows a flowchart illustrating the process of facilitating communication between a portable electronic device connected to a structured network and a printer in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

Initially, a peer-to-peer connection between the portable electronic device and the printer is used to confirm use of the structured network for subsequent communication between the portable electronic device and the printer (operation 602). The structured network may correspond to a Wi-Fi network. To confirm use of the structured network for the communication, a selection of an option to connect the printer to the structured network may be obtained from a user of the portable electronic device, or a request from the printer to connect to the structured network may be received at the portable electronic device. Use of the structured network for the communication may also be triggered if the distance between the portable electronic device and the printer exceeds the range of the peer-to-peer connection.

The peer-to-peer connection is also used to authenticate use of the printer by a user of the portable electronic device (operation 604). As discussed above, use of the printer may be authenticated by confirming physical access to the printer by the user.

Use of the structured network for the communication may then be enabled by transmitting credentials for the structured network from the portable electronic device to the printer (operation 606). For example, the portable electronic device may transmit a network name and password for the structured network to the printer over the peer-to-peer connection, and the printer may use the network name and password to connect to the structured network. Once the printer is connected to the structured network, the communication is transferred from the peer-to-peer connection to a direct connection between the portable electronic device and the printer on the structured network (operation 608).

The communication may also be modified based on the congestion level of the structured network (operation 610). If the structured network is not congested, the communication may remain on the direct connection until the direct connection is removed (e.g., after the printer has completed a print job from the portable electronic device). If the structured network is congested, the communication is transferred from the direct connection back to the peer-to-peer connection (operation 612). The communication may subsequently be transferred back to the direct connection if the structured network becomes less congested and/or if the portable electronic device moves out of range of the peer-to-peer connection.

Figure 7:
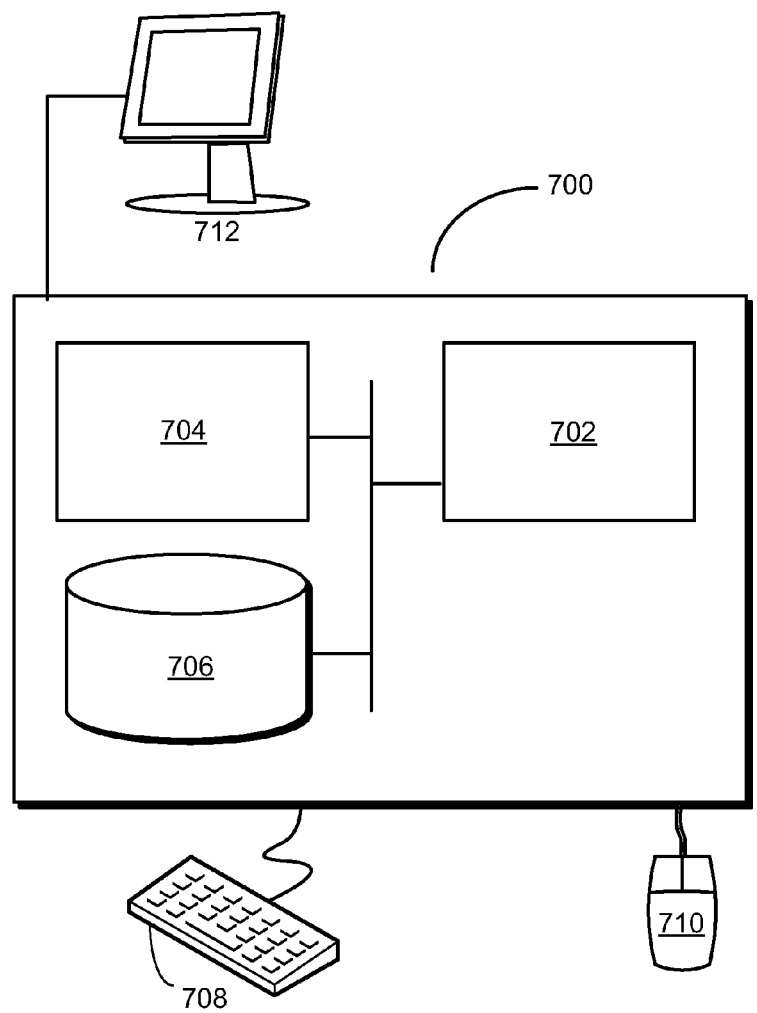
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for performing a print job. The system may include a discovery apparatus and a communication apparatus. The discovery apparatus may detect a printer in proximity to a portable electronic device associated with the print job. Next, the discovery apparatus may establish a peer-to-peer connection between the portable electronic device and the printer and use the peer-to-peer connection to obtain a set of printer attributes from the printer. If the printer attributes match the print job, the communication apparatus may establish a direct connection between the printer and the portable electronic device and send the print job to the printer over the direct connection for execution of the print job by the printer. The communication apparatus may also monitor the print job over the direct connection and remove the direct connection after the printer has completed the print job.

The discovery apparatus and communication apparatus may additionally facilitate communication between a portable electronic device connected to a structured network and a printer. The discovery apparatus may use the peer-to-peer connection between the portable electronic device and the printer to confirm use of the structured network for subsequent communication between the portable electronic device and the printer. Next, the communication apparatus may enable use of the structured network for the communication by transmitting credentials for the structured network from the portable electronic device to the printer. After the printer is connected to the structured network using the transmitted credentials, the communication apparatus may transfer the communication from the peer-to-peer connection to the structured network.

In one or more embodiments, computer system 700 also provides a system for facilitating the execution of a print job. The system may obtain a selection of a printer for a print job and transmit the selection to the printer to enable use of the selection by the printer in generating output that facilitates identification of the printer by a user. Upon receiving confirmation of physical access to the printer by the user, the system may establish a direct connection with the printer and use the direct connection to perform the print job.

In addition, one or more components of computer system 700 may be remotely located and connected to the other components over a network. Portions of the present embodiments (e.g., discovery apparatus, communication apparatus, portable electronic device, printer, etc.) may also be located on different nodes of a distributed system that implements the embodiments. For example, the present embodiments may be implemented using a number of portable electronic devices connected to a set of printers using a set of peer-to-peer and/or direct connections.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   in a printer, performing operations for:
      receiving a signal from a portable electronic device indicating that the printer has been selected;
      confirming physical access to the printer by a user of the portable electronic device by detecting a push of a button on the printer; and
      upon confirming the physical access, establishing a connection between the portable electronic device and the printer, wherein the connection enables the portable electronic device to use the printer to perform a print job.

2. The method of claim 1, further comprising:
   in the printer, performing operations for:
      generating, in response to the signal, an output that facilitates identification of the printer by the user.

3. The method of claim 2, wherein the output is at least one of a beep, a custom sound, a flash, and a message.

4. The method of claim 1, wherein the connection comprises a structured network connection.

5. The method of claim 4, wherein the structured network connection comprises a Wi-Fi network connection.

6. A method, comprising:
   in a portable electronic device, performing operations for:
      sending a signal to a printer, the signal indicating that the printer has been selected, wherein the signal is configured to cause the printer to confirm physical access to the printer by a user of the portable electronic device by detecting a push of a button on the printer; and
      establishing, based on the confirmation of the physical access, a connection between the portable electronic device and the printer, wherein the connection enables the portable electronic device to use the printer to perform a print job.

7. The method of claim 6, further comprising:
   in the portable electronic device, performing operations for:
      receiving a selection of the printer.

8. The method of claim 7, wherein the selection is received from one of:
   a user; and
   the portable electronic device.

9. The method of claim 6, wherein the connection comprises a structured network connection.

10. The method of claim 9, wherein the structured network connection comprises a Wi-Fi network connection.

11. A method, comprising:
    in a printer, performing operations for:
       receiving a signal from a portable electronic device indicating that the printer has been selected;
       confirming physical access to the printer by a user of the portable electronic device by detecting an entry of an identifier on the printer; and
       upon confirming the physical access, establishing a connection between the portable electronic device and the printer, wherein the connection enables the portable electronic device to use the printer to perform a print job.

12. The method of claim 11, further comprising:
in the printer, performing operations for:
generating, in response to the signal, an output that facilitates identification of the printer by the user.

13. The method of claim 12, wherein the output is at least one of a beep, a custom sound, a flash, and a message.

14. The method of claim 11, wherein the connection comprises a structured network connection.

15. The method of claim 14, wherein the structured network connection comprises a Wi-Fi network connection.

16. A method, comprising:
in a portable electronic device, performing operations for:
sending a signal to a printer, the signal indicating that the printer has been selected, wherein the signal is configured to cause the printer to confirm physical access to the printer by a user of the portable electronic device by detecting an entry of an identifier on the printer; and
establishing, based on the confirmation of the physical access, a connection between the portable electronic device and the printer, wherein the connection enables the portable electronic device to use the printer to perform a print job.

17. The method of claim 16, further comprising:
in the portable electronic device, performing operations for:
receiving a selection of the printer.

18. The method of claim 17, wherein the selection is received from one of:
a user; and
the portable electronic device.

19. The method of claim 16, wherein the connection comprises a structured network connection.

20. The method of claim 19, wherein the structured network connection comprises a Wi-Fi network connection.

* * * * *